United States Patent [19]

Brown

[11] 3,716,795

[45] Feb. 13, 1973

[54] TIME COMB GENERATOR

[75] Inventor: Buck C. Brown, Rockville, Md.

[73] Assignee: Control Concepts Corporation, Rockville, Md.

[22] Filed: March 18, 1971

[21] Appl. No.: 125,647

[52] U.S. Cl. .................328/63, 178/69.5 G, 328/187

[51] Int. Cl. ...........................H03k 3/02, H04n 5/06

[58] Field of Search ......178/69.5 G; 307/221 R, 224, 307/225, 269; 328/37, 39, 48, 49, 187, 63

[56] References Cited

UNITED STATES PATENTS

| | | | |
|---|---|---|---|
| 2,972,718 | 2/1961 | Alperin et al. | 328/48 |
| 3,002,151 | 9/1961 | Broderick | 328/48 |

*Primary Examiner*—Robert L. Griffin
*Assistant Examiner*—George G. Stellar
*Attorney*—Pennie, Edmonds, Morton, Taylor & Adams

[57] ABSTRACT

A time comb generator for a television synchronizing generator having a series of three shift register dividers connected in cascade. A pulse train having a frequency of 14.318 MHz is fed to the first shift register which divides the frequency of the pulse train by ten. The divided signal is then fed to a second shift register which also divides by ten. The output of the second shift register is then fed to a third shift register which divides by six. The cascaded arrangement of shift registers are recycled each time 455 pulses have been fed thereto. This is twice the rate at which the horizontal lines are scanned in a television system.

The first two shift registers have five stages and the last has three stages, each of which provide an output incrementally time spaced from the other at equal time intervals, that is, e.g., 10 different outputs can be derived from the first shift register, one being spaced from the next by approximately 70 nanoseconds. The second shift register provides ten equally spaced output signals each approximately 700 ns apart. The third shift register provides six equally spaced output signals each approximately 7000 ns apart. The outputs from the various stages are then selectively combined in a desired manner to position the leading and trailing edges of the various component signals in a television sync signal.

4 Claims, 4 Drawing Figures

INVENTOR
BUCK C. BROWN
BY
Pennie, Edmonds, Morton, Taylor & Adams
ATTORNEYS

INVENTOR
BUCK C. BROWN

BY
Pennie, Edmonds, Morton, Taylor & Adams
ATTORNEYS

INVENTOR
BUCK C. BROWN

BY
Pennie, Edmonds, Morton, Taylor & Adams
ATTORNEYS

TIME COMB GENERATOR

BACKGROUND OF THE INVENTION

This invention relates to a time comb generator and, more particularly, to a time comb generator for controlling a television synchronizing generator.

In television systems, a sensing element having a small area is scanned over the image to be transmitted. The sensing element generates an electrical signal which is proportional to the brightness of the image at the position of the sensing element. This brightness signal is transmitted to a receiver where an electron beam is moved across the screen of a picture tube in a path corresponding to that taken by the sensing element. The intensity of the electron beam is controlled by the brightness signal and, thus, the original image is reproduced on the screen. The scanning is typically done by moving the sensing element and the electron beam almost horizontally from left to right at a uniform speed along a straight line. When the bottom line has been scanned, the sensing element returns quickly to the upper left-hand corner and the entire process is repeated.

In order for a picture to be accurately reproduced, the television system must be provided with a pulse generator for producing horizontal drive pulses to cause the beam to be scanned horizontally and vertical drive pulses to cause the beam to be returned from the bottom to the top of the picture after the bottom line has been scanned. A subcarrier burst must be produced to provide color reference information and equalizing pulses must be produced so that horizontal synchronizing is not lost during the vertical synchronizing interval. A number of other signals must also be produced in order to generate a practical television signal. These various signals are combined in a fixed relationship and transmitted along with the aforementioned brightness signal as a single composite signal, the various parts of which are again separated in a television receiver.

In a standard television system, the scanning takes place at a rate of 525 lines per frame and the frame repetition is at a rate of approximately 30 frames per second, a frame being a complete scanning of the picture area. In order to reduce flicker, the television picture is driven by interlace scanning which consists of scanning alternate lines and then going back and scanning the remaining lines during each frame. Thus, the scanning of a frame is divided into two parts, each part being referred to as a field. The field rate therefore is twice the frame rate or approximately 60 fields per second. It is at this rate that vertical synchronizing signals occur, while the horizontal synchronizing pulses occur at a rate of approximately 30 × 525 or 15, 750 pulses per second. The time period necessary to trace a single horizontal line is normally designated by the symbol H.

In a standard television system, the vertical sync signal consists of a train of six pulses, each train having a duration equal to the time required for tracing three horizontal lines (3H). These vertical synchronizing pulses have a much greater time duration than the horizontal synchronizing pulses so that the means utilized for controlling the triggering of the electron beam from bottom to top will respond to the vertical pulses but not the horizontal pulses. A train of equalizing pulses of short duration are generated before and after the vertical synchronizing signal. Each train of equalizing pulses is comprised of six pulses and has a total duration equal to the time necessary to trace three horizontal lines (3H).

The purpose of a synchronizing pulse generator in a television system is to generate these various pulses (horizontal and vertical blanking pulses, horizontal and vertical synchronizing pulses, subcarrier burst information and equalizing pulses) and to properly position them so that an accurate picture is reproduced.

In order to establish a proper time relation between these various pulses, an accurate clock pulse generator and various timing circuits are required in the synchronizing generator. A number of techniques for fulfilling this purpose have been proposed. Generally, these systems utilize one or more monostable multivibrators or passive delay lines to produce the various pulses, the time constants being arranged so that the output pulses are of proper duration. The frequency of the various pulses are usually established by conventional binary frequency dividers and associated circuitry. The use of monostable multivibrators in producing the various pulses, however, creates a problem in maintaining pulse stability since they are notoriously unstable devices. Such monostable circuits also cause pulse width variances and resolution problems. Passive delay lines are significantly more stable than multivibrators but provide little flexibility. Today, because of the complexity of color television and extensive multi-source programming, the broadcasting networks have placed stringent time position and pulse width requirements on synchronized television waveforms. Thus, in addition, reproduction of television signals by video tape recording techniques required great accuracy in positioning the component pulses in a television sync signal. The networks have found that the tighter the tolerances are held in a television synchronizing signal, the more flexibility they have in programming. In addition, television broadcasters might wish to position the subcarrier burst, the horizontal synchronizing pulse, etc., at slightly different positions than usual. Therefore, the requirement has arisen for a television synchronizing generator which produces not only synchronizing pulses having a minimum pulse jitter and exact pulse width but also having a provision for adjusting the position of each portion of the composite synchronizing signal with respect to each other.

It, therefore, is an object of this invention to provide a time comb generator for accurately positioning the various pulses in a composite television synchronizing signal.

It is another object of this invention to provide a time comb generator for variably positioning the various pulses with respect to each other.

SHORT STATEMENT OF THE INVENTION

Accordingly, this invention provides a time comb generator having three shift registers connected to cascade for dividing the frequency of a 14.318 MHz pulse train. Each of the shift register elements are driven by a common stable clock pulse train thereby eliminating accumulation of time jitter produced by the register. The first shift register having five stages divides the pulse train by ten. The output thereof is divided by ten in a second second shift register having five stages. The last shift register having three stages divides the output from the second shift register by six. The cascaded arrangement of shift registers are recycled each time 455 pulses have been fed thereto thus providing a recycling rate at twice the horizontal line frequency of a television sync signal. Each stage in the cascaded arrangement provides an output so that the exact position and duration of each component of a sync pulse may be selected by deriving an output from one or more of the various outputs.

Other objects, advantages and features of this invention will be more fully understood from the accompanying detailed specification, appended claims and the following drawings in which:

DETAILED DESCRIPTION

Figure 1:
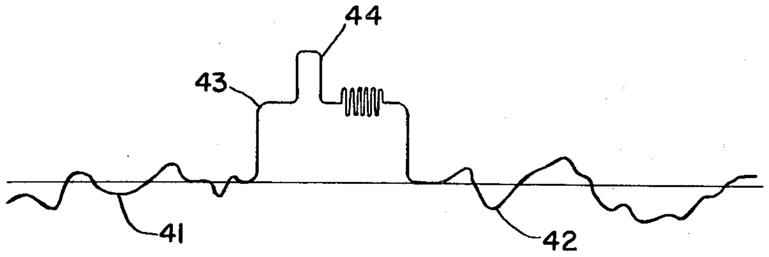
FIG. 1 is a portion of a composite color television signal.

Refer now to FIG. 1 which shows a portion of a composite video signal which exists in a color television transmission system. The signal includes video picture signals 41 and 42 which provide luminance and color information to produce a television picture. The signal also includes a substantially rectangular horizontal blanking pulse 43 upon which is superimposed a horizontal synchronizing pulse 44. The blanking pulse also includes a trailing portion, referred to as a "back porch," which contains a color synchronizing burst consisting of approximately eight cycles of 3.579545 MHz subcarrier signal.

Figure 2:
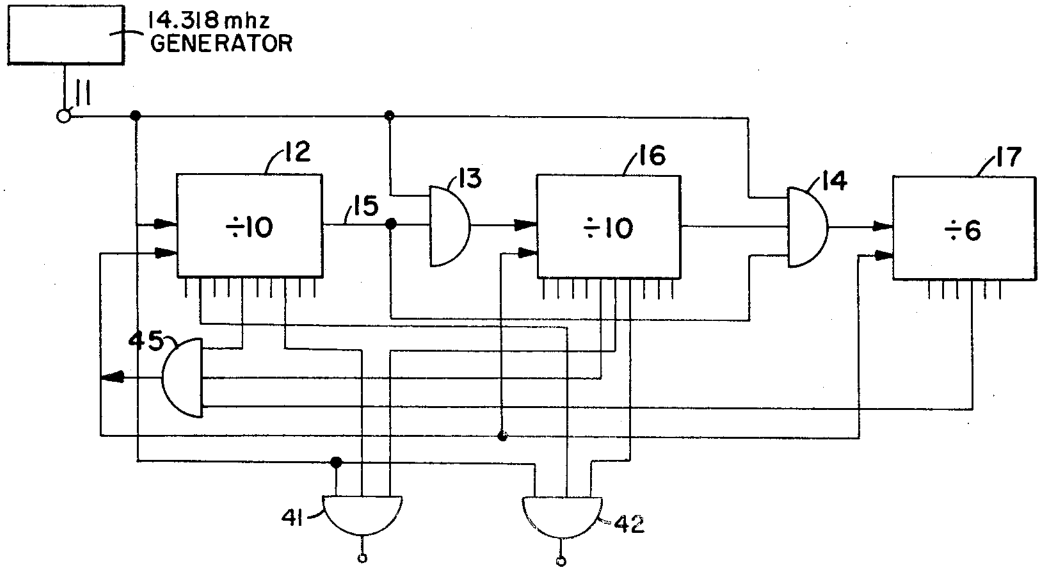
FIG. 2 is a block diagram of the clock pulse generator of this invention.

Refer now to FIG. 2 which shows a block diagram of the time comb generator of this invention. A 14.31818 MHz clock pulse train is fed to the generator at input 11. This signal is simultaneously fed to each stage of the first shift register divider 12, to "and" gate 13 and to "and" gate 14. Shift register 12 divides the frequency of the input clock pulse train by ten and feeds the output thereof along line 15 to "and" gate 13. Upon the simultaneous appearance at the input of gate 13 of an output from shift register 12 and a pulse from input line 11, a pulse is fed to the second shift register divider 16. This divider divides the frequency of the signal from shift register 12 by ten, the output thereof providing a total division of one hundred. This signal is fed to "and" gate 14. Upon the simultaneous appearance at the input of gate 14 of the output of shift registers 12 and 16 along with a pulse from the clock pulse input circuit 11, a signal pulse is fed to a third shift register 17. Shift register 17 divides the frequency of the signal output of shift register 16 by six. Each of the three cascaded shift registers are clocked by a single clock pulse source so that pulse jitter produced by the elements of the shift register does not accumulate. Accordingly, the time comb generator of this invention has an accuracy that is substantially independent of the shift registers error.

As shown in the figure, each stage of the shift register has two output terminals associated therewith, there being five stages in shift registers 12 and 16 and three stages in shift register 17. In shift register 12, a pulse appears on each output line at approximately 70 nanosecond intervals. Thus, the second output occurs approximately 70 nanoseconds after the first output and so on. The signals at the various outputs of shift register 16 occur at approximately 7000 nanosecond intervals. Thus, it can be seen that by selectively deriving an output signal from the three shift registers, a synchronizing signal can be positioned to a resolution of 70 nanoseconds.

Figure 3:
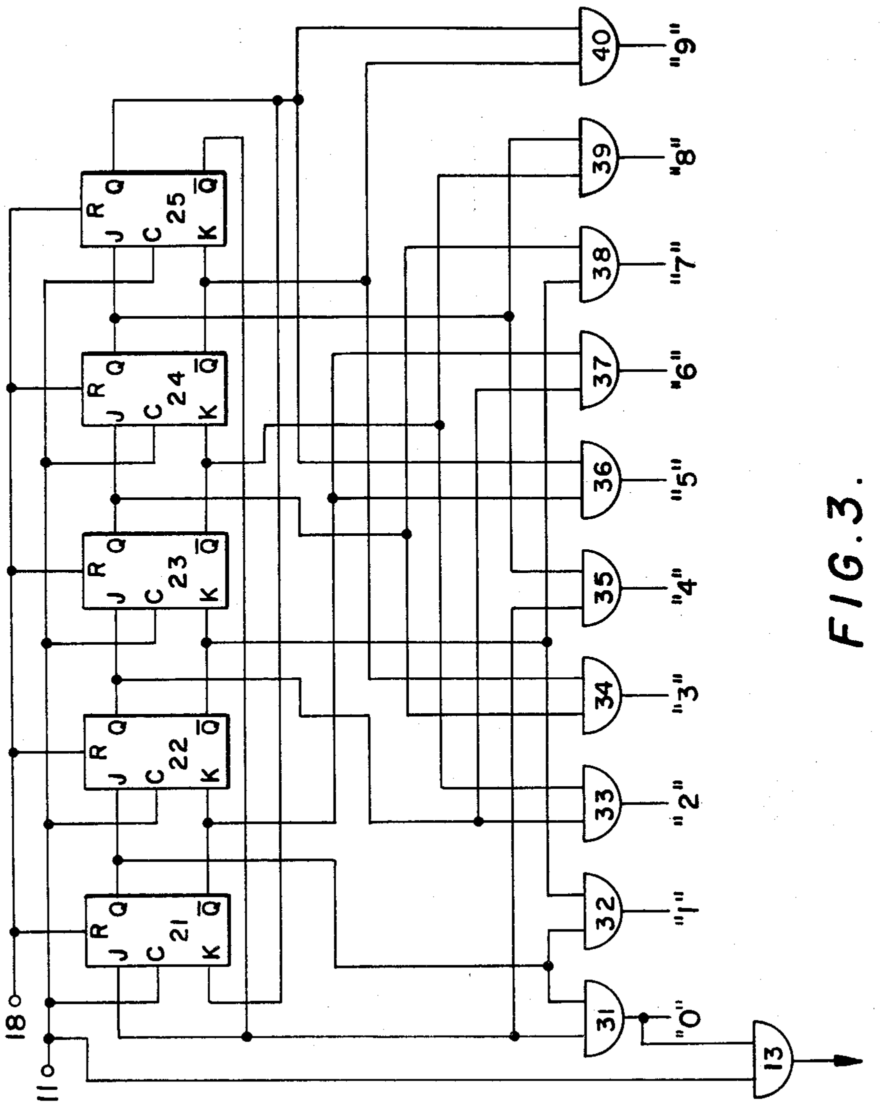
FIG. 3 is a block diagram of one of the shift registers utilized in FIG. 2.

Refer now to FIG. 3 which shows a more detailed block diagram of the shift register circuit 12. A clock pulse signal having a frequency of 14.31818 MHz is fed to input line 11. This signal is fed in parallel, i.e., simultaneously, to each of five cascaded JK flip-flops 21–25. The signal is also fed to the input of an "and" gate 13. Initially, a reset pulse is applied via line 18 to all of the flip-flops and resets all Q outputs to the zero state. Each of the other flip-flops have their J and K inputs connected respectively to the preceeding Q and $\overline{Q}$ outputs except for flip-flop 21 which is connected in reverse. When the first pulse on input line 11 is fed to flip-flop 21, a 1 appears at the Q output and a zero appears at the $\overline{Q}$ output. Thus, flip-flops 21 and 22 now have J inputs in the 1 state and K inputs in the zero state and all the rest of the flip-flops have their inputs in the zero state. Upon the occurrence of the second pulse along input line 11, the 1 state of the J input to flip-flop 22 is transferred to the output thereof. This sequence of operation repeats itself until the 1 state appears at the output of all five flip-flops 21–25. When this occurs the 1 state is reverse connected back to the J input of JK flip-flop 21 providing an 0 state input. The 0 state then sequentially passes from one flip-flop to the next until 0 appears at the Q outputs of all flip-flops 21–25. This signal state is then reverse fed back to the J input of JK flip-flop 21 and the cycle is complete. It can be seen from the aforementioned discussion that ten clock pulses are required for the 1 state and the 0 state to completely circulate through the JK flip-flops 21–25 and back to its original position. The Q and $\overline{Q}$ outputs from JK flip-flops are fed to AND gates 31–40 as shown in FIG. 3. The outputs of the flip-flops are decoded by the AND gates to provide individual output signals, "0" through "9." Since the period between pulses at the input is 70 nanoseconds, it can be seen that the pulse positions on each of the output lines "0"–"9" will be 70 nanoseconds apart and each has a duration of 70 nanoseconds.

Figure 4:
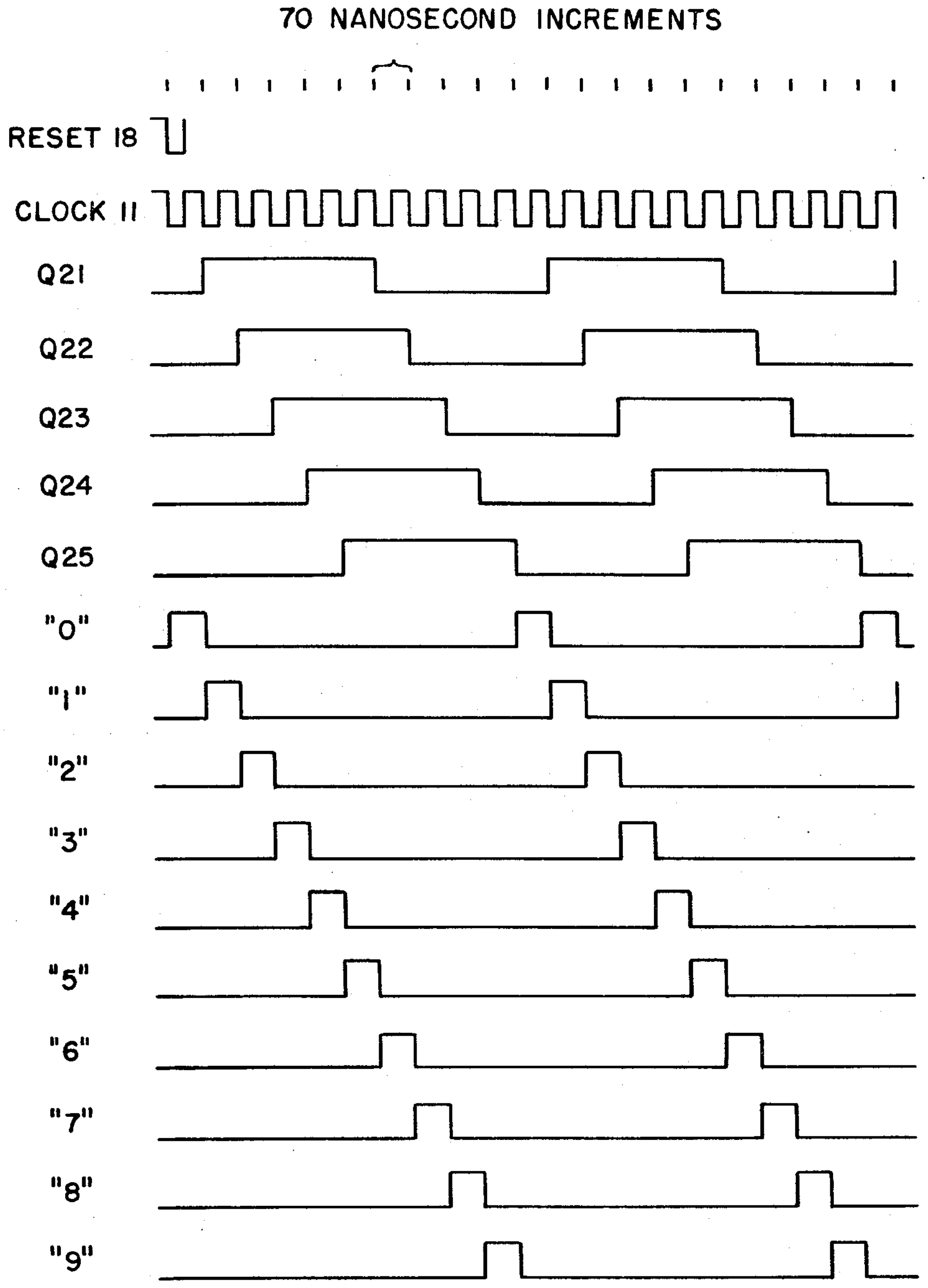
FIG. 4 is a series of waveforms derived from several sections of the first shift register.

Refer now to FIG. 4 which shows a graphical display of the reset pulse 18, the clock pulses 11, the Q outputs of the flip-flops, and the "0" through "9" outputs of the AND gates 31–40. The clock pulse repetition rate is 14.31818 MHz which the "0" through "9" outputs divide by ten to give 1.431818 MHz. AND gate 13 gates the clock pulses and allows only one of each ten clock pulses to appear at the gate's output. The output of gate 13 drives the succeeding shift register divider 16.

Shift register 16 is connected in the same way as shift register 12 and produces an output waveform at each of ten outputs each waveform having a frequency of 0.1431818 MHz and each output signal is displaced from the previous output by 700 nanoseconds. The shift register 17 has only three JK flip-flops connected in cascade as opposed to five as in the previously mentioned shift registers 16 and 17. The signals from each of its six outputs have a repetition rate of 23.67 kHz and the pulses at its respective outputs are displaced by 7000 nanoseconds.

The three cascaded shift registers 12, 16 and 17 are reset each time 455 pulses have been fed to input 11. This is accomplished by feeding the outputs from the fifth stage of shift register 12, the fifth stage of shift register 16 and the fourth stage of register 17 to an "and" gate 45. Simultaneously occurring signals at each of these outputs will not occur until 455 pulses have been fed to the generator input 11. The signal from gate 45 is fed back via reset line 18 to each shift register to reset its count to zero. The resetting of the cascaded registers takes place at twice the rate at which the horizontal lines are scanned or 31.468 kHz. This frequency, i.e., the rate at which the registers are recycled, may be further divided to generate pulses for defining the rate at which the horizontal and vertical sync pulses are generated.

The various pulses forming a composite television sync signal may each be positioned by selecting a combination of outputs from the outputs of the shift registers to establish well-defined time positions. If, for example, it is desired to have the horizontal synchronizing pulses be 4760 nanoseconds wide, the outputs from the sixth stage of shift register 16 and the eighth stage of shift register 12 are fed to an "and" gate (gate 41). An output signal from the eighth stage of register 12 will not occur until 8 × 70 or 560 nanoseconds have elapsed. Thus, the duration of the horizontal sync pulse can be defined by selecting the first pulse output from the first stage or shift register 12 to initiate a sync pulse and the simultaneous occurrence of pulses at the sixth stage of register 16 and the eighth stage of register 12 to terminate the sync pulse. Now, if another broadcaster desires to have the horizontal sync pulse 5040 nanoseconds wide, the outputs from the seventh stage of shift register 16 and the second stage of shift register 12 are simultaneously fed to the "and" gate 42 which produces an output 5040 nanoseconds after a first output appears at the first stage of the register 12.

In a similar manner, the various components of a composite sync signal may be positioned with respect to each other at different intervals within 70 nanosecond intervals by appropriately connecting the outputs from one or more of the cascaded arrangement of shift registers.

Thus, while the preferred embodiment of the invention has been shown and described, it will be understood that the invention may be embodied otherwise than as is herein illustrated and described and that certain changes in the form and arrangement of the parts and in the specific nature of practicing the invention may be made without departing from the spirit of the invention as defined by the appended claims.

I claim:

1. A time comb generator in a television synchronizing generator comprising
   - means for generating a high frequency pulse waveform,
   - a first shift register having five stages of flip-flops,
   - means for inverting and feeding back the output of said first register to the input of said first register to provide a total cycle of 10 counts,
   - means for driving said first shift register by said high frequency pulse waveform,
   - a second shift register having five stages of flip-flops,
   - means for inverting and feeding back the output of said second register to the input of said second register to provide a total cycle of 10 counts,
   - means for driving said second shift register by the simultaneous occurrence of each tenth count of said first shift register and a pulse from said high frequency pulse waveform,
   - a third shift register having three stages of flip-flops,
   - means for inverting and feeding back the output of said third shift register to the input of said third register to provide a total cycle of six counts,
   - means for driving said third shift register by the simultaneous occurrence of the tenth count of said first shift register, the tenth count of said second shift register and a pulse from said high frequency waveform,
   - means for resetting said shift registers, and
   - means for selectively deriving the pulse outputs from the stages of the shift registers, said pulses being utilized to define the leading and trailing edges of the components of a television synchronization signal.

2. The time comb generator of claim 1 wherein said pulse waveform has a frequency of 14.318 mHz.

3. The time comb generator of claim 2 wherein said means for resetting said shift registers comprises an "and" gate having its input terminals selectively connected to one output of each shift register.

4. The time comb generator of claim 3 wherein said input terminals of said "and" gate are connected to the fifth output of said first shift register, the fifth output of said second register, and the fourth output of said third shift register, said resetting means resetting said shift registers after 455 pulses from said pulse waveform have been fed to said registers.

* * * * *